United States Patent [19]

Loev

[11] B 3,923,809

[45] Dec. 2, 1975

[54] 5-ALKOXY-5-HETEROCYCLIC-1,2,3,6-TETRAHYDRO-4(5H)-PYRIMIDINETHIONES

[75] Inventor: Bernard Loev, Broomall, Pa.

[73] Assignee: SmithKline Corporation, Philadelphia, Pa.

[22] Filed: Aug. 27, 1973

[21] Appl. No.: 392,154

[44] Published under the Trial Voluntary Protest Program on January 28, 1975 as document no. B 392,154.

[52] U.S. Cl. 260/256.5 R; 260/250 R; 260/256.4 R; 260/287 R; 260/288 R; 260/289 R; 260/294.8 E; 260/294.9; 260/295 AM; 260/295 R; 260/302 R; 260/326.2; 260/326.5 S; 260/326.5 R; 424/251

[51] Int. Cl.² .................................. C07D 239/06
[58] Field of Search ...................... 260/256.5 R

[56] References Cited
UNITED STATES PATENTS

| | | | |
|---|---|---|---|
| 3,510,490 | 5/1970 | D'Amico | 260/256.5 R |
| 3,574,213 | 4/1971 | D'Amico | 260/256.5 R |

*Primary Examiner*—R. Gallagher
*Attorney, Agent, or Firm*—Joan S. Keps; Richard D. Foggio; William H. Edgerton

[57] ABSTRACT

The compounds are 5-alkoxy-5-heterocyclic-1,2,3,6-tetrahydro-4(5H)-pyrimidinethiones which are inhibitors of gastric acid secretion.

6 Claims, No Drawings

5-ALKOXY-5-HETEROCYCLIC-1,2,3,6-TETRAHYDRO-4(5H)-PYRIMIDINETHIONES

This invention relates to new 5-alkoxy-5-heterocyclic-1,2,3,6-tetrahydro-4(5H)-pyrimidinethiones having pharmacological activity. In particular, these compounds inhibit gastric acid secretion.

The compounds of this invention are represented by the following formula:

FORMULA I

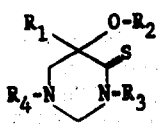

in which:
R$_1$ is 2-pyridyl, 2-pyrimidyl, 4-pyrimidyl, 2-pyrazinyl, 2-pyrrolyl, 2-quinolyl, 1-thiazolyl or 4-thiazolyl;
R$_2$ is lower alkyl, allyl or cyclopropanemethyl and
R$_3$ and R$_4$ are hydrogen or lower alkyl
or a pharmaceutically acceptable acid addition salt thereof.

The pharmacologically active compounds of this invention have the basic structure of Formula I. However, it is apparent to one skilled in the art that well known nuclear substituents such as lower alkyl, lower alkoxy or halogen may be incorporated on the heterocyclic rings. These substituted compounds are used as are the parent compounds.

In the compounds of Formula I, preferably R$_1$ is 2-pyridyl. Also, preferably R$_2$ is methyl.

Preferred compounds of this invention are 1,2,3,6-tetrahydro-5-methoxy-1,3-dimethyl-5-(2-pyridyl)-4(5H)-pyrimidinethione and 1,2,3,6-tetrahydro-5-methoxy-3-methyl-5-(2-pyridyl)-4(5H)-pyrimidinethione.

The compounds of this invention produce inhibition of gastric acid secretion. This activity is demonstrated by administration to pylorus ligated rats at doses of about 30 mg./kg. to about 60 mg./kg. orally. Also, this activity is demonstrated by administration to chronic gastric fistula rats (Brodie et al., *Amer. J. Physiol.* 202:812-814, 1962) at doses of about 50 mg./kg. orally. In these procedures, compounds which produce an increase in gastric pH or a decrease in the volume of gastric juice or both are considered active.

These compounds show antiulcer activity, for example in the restraint-stress method in which on oral administration to rats these compounds inhibit the development of experimental ulcers.

The compounds of this invention are prepared by the following procedure:

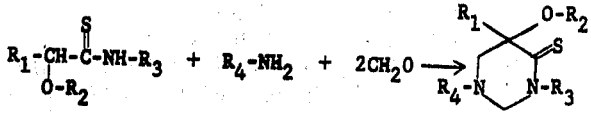

The terms R$_1$, R$_2$, R$_3$ and R$_4$ are as defined above.

According to the above procedure, a 2-alkoxy-2-heterocyclic-thioacetamide is reacted with ammonia or a primary amine and two molar equivalents of formaldehyde. The thioacetamide and/or the ammonia or primary amine may be used in the reaction procedure as the acid addition salt, for example the hydrochloride or sulfate salt. The reaction may be carried out in aqueous solution but is preferably carried out in alcoholic solution, for example in methanol. The reaction is preferably run at about room temperature to about 100°C., most preferably about 40°–80°C.

The thioacetamide starting materials in the above procedure are prepared by the following procedures:

A.

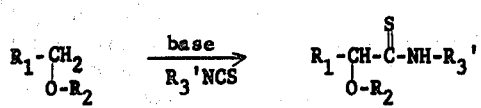

B.

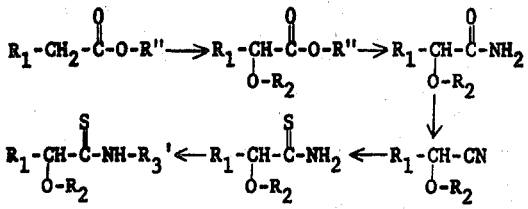

The terms R$_1$ and R$_2$ are as defined above; R'' is lower alkyl, preferably methyl or ethyl; and R$_3$' is lower alkyl.

According to procedure A, an alkoxymethyl heterocycle is reacted with a strong base such as phenyl or butyl lithium and then with an appropriate isothiocyanate to give the N-substituted 2-alkoxy-2-heterocyclic-thioacetamides.

The alkoxymethyl-heterocycles are prepared by reacting a halomethyl-heterocycle with an alkoxide, such as sodium alkoxide, or alternatively, by reacting a heterocyclic-methanol with an appropriate halide, for example a lower alkyl, allyl or cyclopropanemethyl chloride or bromide, in the presence of a base such as sodium hydride.

According to procedure B, a lower alkyl 2-heterocyclic-acetate is converted to the 2-alkoxy compound by reacting with N-bromo or N-chlorosuccinimide and reacting the resulting 2-bromo or 2-chloro compound with a sodium alkoxide; the resulting lower alkyl 2-alkoxy-2-heterocyclic-acetate is converted to the corresponding acetamide by reacting with ammonium hydroxide; the acetamide is dehydrated to give the corresponding nitrile and the nitrile is converted to a 2-alkoxy-2-heterocyclic-thioacetamide by reacting with hydrogen sulfide in the presence of a base such as an amine or by reacting with ammonium polysulfide or, alternatively, the acetamide is reacted with phosphorus pentasulfide to give the corresponding thioacetamide. The N-substituted thioacetamides may be prepared by reacting the N-unsubstituted compounds with a lower alkylamine.

The lower alkyl 2-alkoxy-2-heterocyclicacetate intermediates in procedure B may also be prepared by reacting an alkoxymethyl-heterocycle (which is an intermediate in procedure A) with a strong base such as phenyl lithium and a lower alkyl chloroformate.

Alternatively, the N-substituted 2-alkoxythioacetamide starting materials may be prepared by reacting a lower alkyl 2-alkoxy-2-heterocyclic-acetate with a lower alkylamine and treating the resulting N-substituted 2-alkoxy-2-heterocyclic-acetamide with phosphorus pentasulfide.

The pharmaceutically acceptable, acid addition salts of the compounds of Formula I are formed with organic and inorganic acids by methods known to the art. For example, the base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of the salts which are included in this invention are maleate, fumarate, succinate, oxalate, benzoate, methanesulfonate, ethanedisulfonate, benzenesulfonate, acetate, propionate, tartrate, citrate, camphorsulfonate, hydrochloride, hydrobromide, sulfate, sulfamate, phosphate and nitrate salts.

The compounds of this invention are administered internally either parenterally, rectally or, preferably, orally in an amount to produce the desired biological activity.

Preferably, the compounds are administered in conventional dosage forms prepared by combining an appropriate dose of the compound with standard pharmaceutical carriers.

The pharmaceutical carrier may be for example a solid or a liquid. Exemplary of solid carriers are lactose, magnesium stearate, terra alba, sucrose, talc, stearic acid, gelatin, agar, pectin, acacia or cocoa butter. The amount of solid carrier will vary widely but preferably will be from about 25 mg. to about 1 gm. Exemplary of liquid carriers are syrup, peanut oil, olive oil, sesame oil, propylene glycol, polyethylene glycol (mol. wt. 200–400) and water. The carrier or diluent may include a time delay material well known to the art such as, for example, glyceryl monostearate or glyceryl distearate alone or with a wax.

A wide variety of pharmaceutical forms can be employed, for example the preparation may take the form of tablets, capsules, powders, suppositories, troches, lozenges, syrups, emulsions, sterile injectable liquids or liquid suspensions or solutions.

The pharmaceutical compositions are prepared by conventional techniques involving procedures such as mixing, granulating and compressing or dissolving the ingredients as appropriate to the desired preparation.

It will be apparent to one skilled in the art that the compounds of this invention have an asymmetric carbon atom and thus may be present as optical isomers. The connotation of the formulas presented herein is to include all isomers, the separated isomers as well as mixtures thereof.

The terms "lower alkyl" and "lower alkoxy" where used herein denote groups having 1–4 carbon atoms and "halogen" denotes chloro, bromo or fluoro.

The following examples are not limiting but are illustrative of the compounds of this invention and processes for their preparation.

EXAMPLE 1

2-(Chloromethyl)pyridine hydrochloride (16.3 g., 0.1 mole) is dissolved in 100 ml. of methanol. Freshly prepared sodium methoxide (5 g., 0.22 mole of sodium dissolved in 150 ml. of methanol) is added dropwise. The resulting mixture is heated at reflux for 18 hours, then filtered. The filtrate is concentrated. Water and ether are added, the aqueous phase is extracted with ether and the combined ethereal phases are washed with water and saturated aqueous sodium chloride, then dried over magnesium sulfate, concentrated and distilled to give 2-(methoxymethyl)pyridine.

Alternatively, 0.1 mole of 2-(chloromethyl)-pyridine and 0.11 mole of sodium methoxide are used in the above procedure to give 2-(methoxymethyl)pyridine.

Also, 2-(methoxymethyl)pyridine is prepared by the following alternative procedure. A mixture of 10.9 g. of 2-pyridinemethanol and 2.4 g. of sodium hydride in 50 ml. of dimethylsulfoxide is warmed on a steam bath for 15 minutes, then cooled to room temperature. Methyl iodide (14.2 g.) is added and then the mixture is heated at 40°C. for 1 hour. Water (150 ml.) is then added and the mixture is extracted with ether. The extracts are dried, concentrated and distilled to give 2-(methoxymethyl)pyridine.

2-(Methoxymethyl)pyridine (4.4 g., 0.036 mole), dissolved in 25 ml. of dry benzene, is added dropwise to 20 ml. of 2M phenyl lithium (0.04 mole) in benzene/ether with cooling. The mixture is stirred for 30 minutes, then methyl isothiocyanate (2.6 g., 0.03 mole), dissolved in 40 ml. of dry benzene, is added dropwise with cooling. The resulting solution is stirred overnight. An equal volume of water is added and the solution is cooled and made acidic with 10% hydrochloric acid. The phases are separated, the organic phase is washed with water and the combined aqueous phases are made basic to about pH 9, then extracted with chloroform. The chloroform extracts are washed with water and dried over magnesium sulfate. Filtration and removal of solvent gives a residue which is recrystallized from isopropyl ether/ethanol to give 2-methoxy-N-methyl-2-(2-pyridyl)thioacetamide, m.p. 104°–105°C.

A solution of 12.0 g. of 2-methoxy-N-methyl-2-(2-pyridyl)thioacetamide, 6.2 g. of methylamine hydrochloride, and 10.0 ml. (0.124 mole) of 37% aqueous formaldehyde in 150 ml. of methanol is stirred for 24 hours at room temperature. After refluxing for two hours, the mixture is stirred at room temperature for four hours, then concentrated in vacuo. Cold aqueous sodium carbonate solution is added. The precipitate is filtered off and washed with water to give 1,2,3,6-tetrahydro-5-methoxy-1,3-dimethyl-5-(2-pyridyl)-4(5H)-pyrimidinethione, m.p. 140°–142°C.

EXAMPLE 2

A solution of 4.0 g. of 2-methoxy-N-methyl-2-(2-pyridyl)thioacetamide, 1.64 g. of ammonium chloride and 4.1 ml. (0.051 mole) of 37% aqueous formaldehyde in 31 ml. of methanol is stirred for 24 hours at room temperature. After refluxing for four hours, the mixture is allowed to stand for 18 hours, then concentrated in vacuo. The residue is dissolved in water, made basic with 5% aqeuous sodium carbonate solution and extracted into chloroform. The extract is dried over magnesium sulfate, concentrated, and chromatographed on silica gel with acetone. Removing the solvent in vacuo gives 1,2,3,6-tetrahydro-3-methyl-5-methoxy-5-(2-pyridyl)-4(5H)-pyrimidinethione.

The above prepared base is treated with hydrogen chloride in ether and the resulting solid is filtered off and recrystallized from methanol-ether to give 1,2,3,6-tetrahydro-3-methyl-5-methoxy-5-(2-pyridyl)-4(5H)-pyrimidinethione dihydrochloride, m.p. 178°–181°C. (dec.).

EXAMPLE 3

By the procedure of Example 1, using in place of sodium methoxide, the following sodium alkoxides:
sodium ethoxide sodium propoxide
sodium butoxide
sodium allyloxide
sodium cyclopropanemethoxide
the following thioacetamides are obtained, respectively:
  2-ethoxy-N-methyl-2-(2-pyridyl)thioacetamide
  N-methyl-2-propoxy-2-(2-pyridyl)thioacetamide
  2-butoxy-N-methyl-2-(2-pyridyl)thioacetamide
  2-allyloxy-N-methyl-2-(2-pyridyl)thioacetamide
  2-cyclopropanemethoxy-N-methyl-2-(2-pyridyl)thioacetamide.

Reacting the above prepared thioacetamides with formaldhyde and methylamine hydrochloride by the procedure of Example 1 gives the following products, respectively:
  5-ethoxy-1,2,3,6-tetrahydro-1,3-dimethyl-5-(2-pyridyl)-4(5H)-pyrimidinethione
  1,2,3,6-tetrahydro-1,3-dimethyl-5-propoxy-5-(2-pyridyl)-4(5H)-pyrimidinethione
  5-butoxy-1,2,3,6-tetrahydro-1,3-dimethyl-5-(2-pyridyl)-4(5H)-pyrimidinethione
  5-allyloxy-1,2,3,6-tetrahydro-1,3-dimethyl-5-(2-pyridyl)-4(5H)-pyrimidinethione
  5-cyclopropanemethoxy-1,2,3,6-tetrahydro-1,3-dimethyl-5-(2-pyridyl)-4(5H)-pyrimidinethione.

EXAMPLE 4

By the procedure of Example 1, using in place of 2-(chloromethyl)pyridine, the following:
  2-(chloromethyl)pyrazine
  2-(chloromethyl)quinoline
  2-(chloromethyl)thiazole
  4-(chloromethyl)thiazole
the following thiacetamides are obtained respectively:
  2-methoxy-N-methyl-2-(2-pyrazinyl)thioacetamide
  2-methoxy-N-methyl-2-(2-quinolyl)thioacetamide
  2-methoxy-N-methyl-2-(2-thiazolyl)thioacetamide
  2-methoxy-N-methyl-2-(4-thiazolyl)thioacetamide.

The above prepared thioacetamides are reacted with formaldehyde and methylamine hydrochloride by the procedure of Example 1 to give the following products, respectively:
  1,2,3,6-tetrahydro-5-methoxy-1,3-dimethyl-5-(2-pyrazinyl)-4-(5H)-pyrimidinethione
  1,2,3,6-tetrahydro-5-methoxy-1,3-dimethyl-5-(2-quinolyl)-4-(5H)-pyrimidinethione
  1,2,3,6-tetrahydro-5-methoxy-1,3-dimethyl-5-(2-thiazoyl)-4-(5H)-pyrimidinethione
  1,2,3,6-tetrahydro-5-methoxy-1,3-dimethyl-5-(4-thiazolyl)-4(5H)-pyrimidinethione.

EXAMPLE 5

A mixture of 6.3 g. of 2-pyrrolemethanol and 25 ml. of thionyl chloride is heated on a steam bath for four hours. The mixture is then concentrated under reduced pressure and the residue is dissolved in water, basified with 5% aqeuous sodium bicarbonate solution and extracted with ether. The extracts are dried, concentrated and distilled to give 2-(chloromethyl)-pyrrole.

Using 2-(chloromethyl)pyrrole in place of 2-(chloromethyl)pyridine in the procedure of Example 1 gives 1,2,3,6-tetrahydro-5-methoxy-1,3-dimethyl-5-(2-pyrrolyl)-4(5H)-pyrimidinethione.

In the same manner, converting 2-pyrimidinemethanol to 2-(chloromethyl)pyrimidine and using 2-(chloromethyl)pyrimidine in the procedure of Example 1, the product is 1,2,3,6-tetrahydro-5-methoxy-1,3-dimethyl-5-(2-pyrimidyl)-4(5H)-pyrimidinethione.

EXAMPLE 6

4-Pyrimidinecarboxylic acid is reduced using lithium aluminum hydride in ether to give 4-pyrimidinemethanol.

4-Pyrimidinemethanol is converted to 4-(chloromethyl)pyrimidine by the procedure of Example 5.

Using 4-(chloromethyl)pyrimidine in the procedure of Example 1, the product is 1,2,3,6-tetrahydro-5-methoxy-1,3-dimethyl-5-(4-pyrimidyl)-4(5H)-pyrimidinethione.

EXAMPLE 7

To a solution containing 12.1 g. (0.08 mole) of methyl 2-(2-pyridyl)acetate in 120 ml. of carbon tetrachloride is added 14.8 g. (0.084 mole) of N-bromosuccinimide and 0.3 g. of dibenzoylperoxide. The solution is irradiated by means of a sun-lamp source until essentially all the solid (succinimide) has risen to the top (about 10–15 minutes).

The solution is filtered and the solvent removed under reduced pressure and without heat to give methyl 2-bromo-2-(2-pyridyl)acetate.

The above prepared 2-bromo compound is dissolved in 100 ml. of dry methanol and freshly prepared sodium methoxide (0.09 mole) in 100 ml. of dry methanol is added dropwise. Then the mixture is stirred for three hours at room temperature. The solvent is removed under reduced pressure and without heat to give methyl 2-methoxy-2-(2-pyridyl)acetate.

The above prepared 2-methoxy compound is dissolved in 65 ml. of concentrated ammonium hydroxide and the solution is stirred for 6.5 hours. The mixture is then concentrated, dissolved in chloroform and extracted twice with brine. The organic phase is dried over magnesium sulfate and filtered and solvent is removed under reduced pressure to give 2-methoxy-2-(2-pyridyl)acetamide.

To 20 ml. of dry 1,2-dichloroethane containing 2.0 g. of sodium chloride is added 3.32 g. of 2-methoxy-2-(2-pyridyl)acetamide. After stirring at room temperature for 15 minutes, 1.7 ml. of phosphorus oxychloride is added. The solution is refluxed for 18 hours. The solution is then cooled and made basic with 10% aqueous sodium hydroxide solution. The aqueous phase is extracted three times with chloroform and the combined chloroform extracts are washed three times with water and once with brine and dried over magnesium sulfate. Filtration, removal of solvent and distillation in vacuo gives 2-methoxy-2-(2-pyridyl)acetonitrile, b.p. 72°–76°C./0.2 mm.

In 125 ml. of dry pyridine containing 4 ml. of triethylamine is dissolved 2.65 g. (0.018 mole) of 2-methoxy-2-(2-pyridyl)acetonitrile. Hydrogen sulfide is bubbled through the solution for 5.5 hours. The solvent is evaporated under reduced pressure and chloroform is added to the residue. The mixture is allowed to stand at −20°C. for 18 hours. The precipitate is filtered off and recrystallized from isopropanol to give 2-methoxy-2-(2-pyridyl)thioacetamide, m.p. 157°–159°C.

By the procedure of Example 1, reacting the above prepared thioacetamide with formaldehyde and methylamine hydrochloride gives 1,2,3,6-tetrahydro-1-methyl-5-methoxy-5-(2-pyridyl)-4-(5H)-pyrimidinethione.

EXAMPLE 8

By the procedure of Example 2, reacting 2-methoxy-2-(2-pyridyl)thioacetamide with formaldehyde and ammonium chloride gives 1,2,3,6-tetrahydro-5-methoxy-5-(2-pyridyl)-4(5H)-pyrimidinethione.

Reacting the above prepared base with hydrogen chloride in ether gives the dihydrochloride salt.

EXAMPLE 9

By the procedure of Example 2, using in place of 2-methoxy-N-methyl-2-(2-pyridyl)thioacetamide, the following thioacetamides:
   2-ethoxy-N-methyl-2-(2-pyridyl)thioacetamide
   2-butoxy-N-methyl-2-(2-pyridyl)thioacetamide
   2-allyloxy-N-methyl-2-(2-pyridyl)thioacetamide
   2-cyclopropanemethoxy-N-methoxy-2-(2-pyridyl)-thioacetamide
the following products are obtained, respectively:
   5-ethoxy-1,2,3,6-tetrahydro-3-methyl-5-(2-pyridyl)-4(5H)-pyrimidinethione
   5-butoxy-1,2,3,6-tetrahydro-3-methyl-5-(2-pyridyl)-4(5H)-pyrimidinethione
   5-allyloxy-1,2,3,6-tetrahydro-3-methyl-5-(2-pyridyl)-4(5H)-pyrimidinethione
   5-cyclopropanemethoxy-1,2,3,6-tetrahydro-3-methyl-5-(2-pyridyl)-4(5H)-pyrimidinethione.

EXAMPLE 10

Using 2-methoxy-N-methyl-2-(2-quinolyl)-thioacetamide in the procedure of Example 2, the product is 1,2,3,6-tetrahydro-5-methoxy-3-methoxy-5-(2-pyridyl)-4(5H)-pyrimidinethione.

Similarly, using the following thioacetamides in the procedure of Example 2:
   2-methoxy-N-methyl-2-(2-pyrazinyl)thioacetamide
   2-methoxy-N-methyl-2-(2-thiazolyl)thioacetamide
   2-methoxy-N-methyl-2-(4-thiazolyl)thioacetamide
the products are, respectively:
   1,2,3,6-tetrahydro-5-methoxy-3-methyl-5-(2-pyrazinyl)-4(5H)pyrimidinethione
   1,2,3,6-tetrahydro-5-methoxy-3-methyl-5-(2-thiazolyl)-4(5H)-pyrimidinethione
   1,2,3,6-tetrahydro-5-methoxy-3-methyl-5-(4-thiazolyl)-4(5H)-pyrimidinethione.

EXAMPLE 11

A mixture of 2-methoxy-N-methyl-2-(2-pyridyl)thioacetamide (0.1 m.), ethylamine hydrochloride (0.12 m.) and formaldehyde (0.21 m.) in methanol is stirred at room temperature for 24 hours, then refluxed for two hours to give, after concentrating in vacuo and filtering, 1-ethyl-1,2,3,6-tetrahydro-5-methoxy-3-methyl-5-(2-pyridyl)-4-(5H)-pyrimidinethione.

By the same procedure, using propylamine hydrochloride in place of ethylamine hydrochloride, the product is 1,2,3,6-tetrahydro-5-methoxy-3-methyl-1-propyl-5-(2-pyridyl)-4(5H)-pyrimidinethione.

Similarly, using butylamine hydrochloride, the product is 1-butyl-1,2,3,6-tetrahydro-5-methoxy-3-methyl-5-(2-pyridyl)-4(5H)-pyrimidinethione.

EXAMPLE 12

By the procedure of Example 11, reacting ethylamine hydrochloride and formaldehyde with the following thioacetamides:
   2-methoxy-N-methyl-2-(2-quinolyl)thioacetamide
   2-methoxy-N-methyl-2-(2-thiazolyl)thioacetamide
   2-methoxy-N-methyl-2-(4-thiazolyl)thioacetamide
the products are, respectively:
   1-ethyl-1,2,3,6-tetrahydro-5-methoxy-3-methyl-5-(2-quinolyl)-4(5H)-pyrimidinethione
   1-ethyl-1,2,3,6-tetrahydro-5-methoxy-3-methyl-5-(2-thiazolyl)-4(5H)-pyrimidinethione
   1-ethyl-1,2,3,6-tetrahydro-5-methoxy-3-methyl-5-(4-thiazolyl)-4(5H)-pyrimidinethione.

Similarly, by the procedure of Example 11, reacting butylamine hydrochloride and formaldehyde with the thioacetamides listed hereabove, the corresponding 1-butyl-1,2,3,6-tetrahydro-5-methoxy-3-methyl-5-heterocyclic-4(5H)-pyrimidinethiones are prepared.

EXAMPLE 13

By the procedure of Example 12, using the following thioacetamides (prepared using the corresponding chloromethyl-heterocycles as described in Examples 4, 5 and 6):
   2-methoxy-N-methyl-2-(2-pyrazinyl)thioacetamide
   2-methoxy-N-methyl-2-(2-pyrrolyl)thioacetamide
   2-methoxy-N-methyl-2-(2-pyrimidyl)thioacetamide
   2-methoxy-N-methyl-2-(4-pyrimidyl)thioacetamide
the following products are prepared, respectively:
   1-ethyl-1,2,3,6-tetrahydro-3-methyl-5-methoxy-5-(2-pyrazinyl)-4(5H)-pyrimidinethione
   1-ethyl-1,2,3,6-tetrahydro-3-methyl-5-methoxy-5-(2-pyrrolyl)-4(5H)-pyrimidinethione
   1-ethyl-1,2,3,6-tetrahydro-3-methyl-5-methoxy-5-(2-pyrimidyl)-4(5H)-pyrimidinethione
   1-ethyl-1,2,3,6-tetrahydro-3-methyl-5-methoxy-5-(4-pyrimidyl)-4(5H)-pyrimidinethione
and the corresponding 1-propyl and 1-butyl compounds.

EXAMPLE 14

Using, in the procedure of Example 1, the following isothiocyanates in place of methyl isothiocyanate:
   ethyl isothiocyanate
   propyl isothiocyanate
   butyl isothiocyanate
the following thioacetamides are obtained:
   N-ethyl-2-methoxy-2-(2-pyridyl)thioacetamide
   2-methoxy-N-propyl-2-(2-pyridyl)thioacetamide
   N-butyl-2-methoxy-2-(2-pyridyl)thioacetamide.

Reacting the above prepared thioiacetamides with methylamine hydrochloride and formaldehyde by the procedure of Example 1 gives the following products, respectively:
   3-ethyl-1,2,3,6-tetrahydro-5-methoxy-1-methyl-5-(2-pyridyl)-4(5H)-pyrimidinethione
   1,2,3,6,-tetrahydro-5-methoxy-1-methyl-3-propyl-5-(2-pyridyl)-4(5H)-pyrimidinethione
   3-butyl-1,2,3,6-tetrahydro-5-methoxy-1-methyl-2-(2-pyridyl)-4(5H)-pyrimidinethione.

By the same procedures, the corresponding 2-quinolyl, 2-pyrazinyl, 2-pyrrolyl, 2-pyrimidyl, 4-pyrimidyl, 2-thiazolyl and 4-thiazolyl compounds are prepared.

EXAMPLE 15

To 1 g. of 1,2,3,6-tetrahydro-5-methoxy-1,3-dimethyl-5-(2-quinolyl)-4(5H)-pyrimidinethione in ether is added hydrogen bromide in ether to give, after filtering and recrystallizing, the dihydrobromide salt.

EXAMPLE 16

One gram of 1,2,3,6-tetrahydro-5-methoxy-1,3-dimethyl-5-(2-pyridyl)-4(5H)-pyrimidinethione in ethanol is treated with an equimolar amount of maleic acid. The solvent is removed in vacuo to give the maleate salt.

In the same manner, using oxalic acid, the oxalate salt of 1,2,3,6-tetrahydro-5-methoxy-1,3-dimethyl-5-(2-pyridyl)-4(5H)-pyrimidinethione is prepared.

EXAMPLE 17

| Ingredient | Amount |
|---|---|
| 1,2,3,6-tetrahydro-5-methoxy-1,3-dimethyl-5-(2-pyridyl)-4(5H)-pyrimidinethione | 400 mg. |
| lactose | 100 mg. |

The ingredients are mixed and filtered into a hard gelatin capsule.

What is claimed is:

1. A compound of the formula

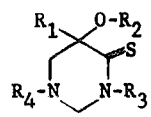

in which:
$R_1$ is 2-pyridyl, 2-pyrimidyl, 4-pyrimidyl, 2-pyrazinyl, 2-pyrrolyl, 2-quinolyl, 2-thiazolyl or 4-thiazolyl;
$R_2$ is lower alkyl, allyl or cyclopropanemethyl and
$R_3$ and $R_4$ are hydrogen or lower alkyl or a pharmaceutically acceptable acid addition salt thereof.

2. A compound of claim 1 in which $R_1$ is 2-pyridyl.
3. A compound of claim 1 in which $R_1$ is 2-quinolyl.
4. A compound of claim 1 in which $R_2$ is methyl.
5. A compound of claim 1, said compound being 1,2,3,6-tetrahydro-5-methoxy-1,3-dimethyl-5-(2-pyridyl)-4(5H)-pyrimidinethione.
6. A compound of claim 1, said compound being 1,2,3,6-tetrahydro-5-methoxy-3-methyl-5-(2-pyridyl)-4(5H)-pyrimidinethione.

* * * * *

UNITED STATES PATENT AND TRADEMARK OFFICE
CERTIFICATE OF CORRECTION

PATENT NO. : 3,923,809
DATED : December 2, 1975
INVENTOR(S) : Bernard Loev

It is certified that error appears in the above-identified patent and that said Letters Patent are hereby corrected as shown below:

Column 1, line 21, "1-thiazolyl" should read
-- 2-thiazolyl -- .

Signed and Sealed this sixth Day of April 1976

[SEAL]

Attest:

RUTH C. MASON
Attesting Officer

C. MARSHALL DANN
Commissioner of Patents and Trademarks